United States Patent [19]

Loch

[11] 4,030,419
[45] June 21, 1977

[54] INSERT FOR EXPLOSIVELY EXPANDING A TUBE INTO ENGAGEMENT WITH A TUBE SHEET

[75] Inventor: Emil P. Loch, Tampa, Fla.

[73] Assignee: Westinghouse Electric Corporation, Pittsburgh, Pa.

[22] Filed: Nov. 20, 1975

[21] Appl. No.: 634,000

[52] U.S. Cl. .................. 102/24 R; 29/421 E; 29/450; 29/453; 29/455 R; 29/157.4
[51] Int. Cl.² .................. C06C 11/00; F42B 1/02; F42B 3/00
[58] Field of Search .............. 29/421 E, 455, 450, 29/453; 102/24 R, 24 HC

[56] References Cited

UNITED STATES PATENTS

| | | | |
|---|---|---|---|
| 1,683,900 | 9/1928 | Karollus | 102/24 R X |
| 2,707,437 | 5/1955 | Noddin et al. | 102/24 R |
| 3,409,969 | 11/1968 | Simons et al. | 29/421 E X |
| 3,426,681 | 2/1969 | Oliver | 102/24 R |
| 3,461,536 | 8/1969 | Skold | 29/453 X |
| 3,543,370 | 12/1970 | Berman et al. | 102/24 R X |
| 3,785,291 | 1/1974 | Bergbauer et al. | 102/24 R |
| 3,919,940 | 11/1975 | Ploger et al. | 102/24 R |

Primary Examiner—Charlie T. Moon
Attorney, Agent, or Firm—F. J. Baehr, Jr.

[57] ABSTRACT

A resilient insert for explosively expanding a tube in a tube sheet having a bore which receives an explosive cord, a counter bore, a sleeve which is fastened to the bored end of the insert to position the tube and a positioning wafer which positions the explosive cord within the insert.

5 Claims, 5 Drawing Figures

INSERT FOR EXPLOSIVELY EXPANDING A TUBE INTO ENGAGEMENT WITH A TUBE SHEET

BACKGROUND OF THE INVENTION

This invention relates to an insert utilized to explosively expand a tube into engagement with the tube sheet and a method for holding the insert in a vertically oriented tube.

Mechanical expansion of tubes and tube sheets or rolling is well known in the art, a more recent development is explosive expansion of tubes into engagement with a tube sheet as described in U.S. Pat. Nos. 3,411,198 and 3,426,681. Explosive expanding is generally faster and more efficient than mechanically expanding and explosive expanding is accompanied by very little axial growth of the tube compared to mechanical expanding. Explosive expanding also requires less access to the tube sheet and reduces the amount of time personnel are in the proximity of the tube sheet. This latter advantage is particularly important when the heat exchanger is radioactive.

SUMMARY OF THE INVENTION

In general a resilient insert for explosively expanding tubes into engagement with a tube sheet utilizing an explosive cord, when made in accordance with this invention, comprises an outer diameter which is slightly smaller than the inner diameter of the tube, a length substantially longer than the tube sheet is thick, a bore extending from one end of the insert for receiving the explosive cord. The bore is substantially longer than the tube sheet is thick, but does not extend all the way through the insert. The insert also has a counterbore and comprises a sleeve attached to the bored end. The sleeve extends beyond the end of the insert and has diametrically opposed triangular slots. The bottom of the slots are disposed adjacent the end of the insert. The insert also comprises a positioning wafer having an outer diameter slightly smaller than the inner diameter of the sleeve. The wafer has a centrally disposed opening which tightly embraces the explosive cord and is disposed to abut the end of the insert to position the explosive cord within the bore.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
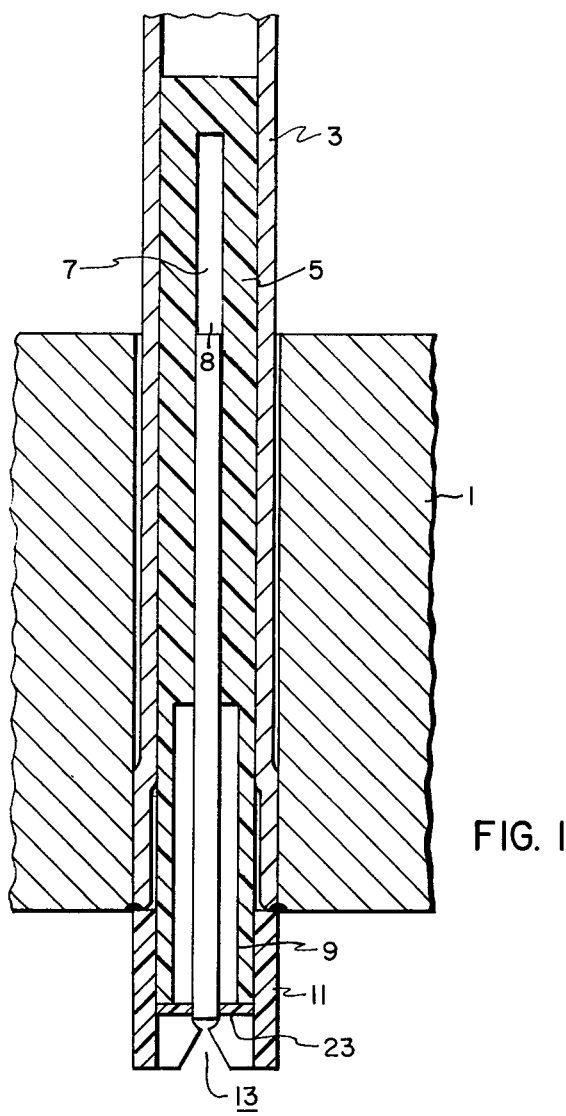
FIG. 1 is a parital sectional view of a heat exchanger having a tube which is to be explosively expanded into engagement with a tube sheet utilizing a resilient tubular insert.

Referring now to the drawings in detail and in particular to FIG. 1, there is shown a portion of a tube sheet 1 of a heat exchanger having a partially expanded tube 3 extending vertically upwardly therefrom. A resilient tubular insert 5 for explosively expanding the tube into engagement with the tube sheet 1 is disposed in the tube 3. The resilient tubular insert 5 is preferably made of polyethylene or other resilient material, which will take a set when bent and has an outer diameter which fits snugly into the tube 3 and a centrally disposed bore 7, which extends partially through the insert so that the one end thereof is closed. The bore 7 is the proper diameter to receive an explosive cord 8 often referred to as a primacord or detonating cord, which when detonated will produce an explosive shock wave, which will expand the insert with sufficient force to expand the tube 3 into engagement with the tube sheet 1 so as to generally form a leak-proof joint therebetween. The insert 5 and bore 7 are substantially longer than the tube sheet 1 is thick to provide an expansion chamber within the insert to trap the products formed by the explosion of the explosive cord 8.

The insert 5 also has a counterbore 9 which forms an attenuation chamber adjacent the outer end of the insert 5 and adjacent the area where the tube 3 is rolled and welded to the tube sheet 1 in order to reduce the explosive forces transmitted to the tube wall in the region of the tube to tube sheet weld and in the area where the tube has already been mechanically expanded into engagement with the tube sheet.

Figure 2:
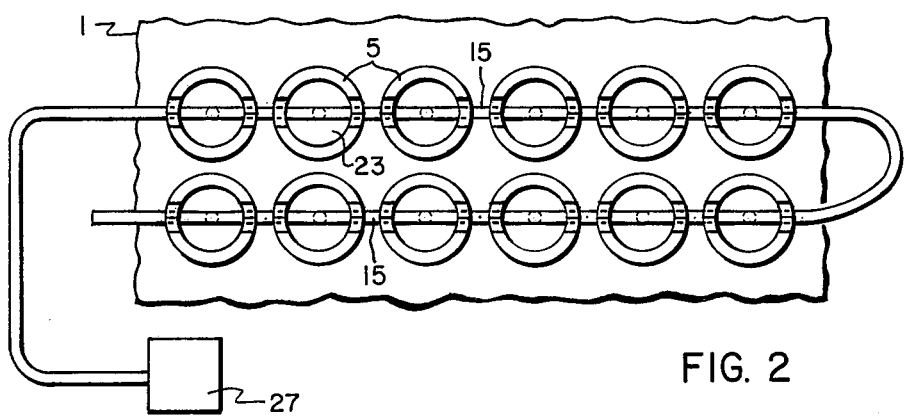
FIG. 2 is a partial sectional view showing an array of inserts disposed within a plurality of tubes.

A resilient sleeve 11 fits over and is fastened or fixed to the open end of the insert 5. The sleeve 11 has a pair of diametrically opposed slots 13 for receiving and snugly holding a detonating cord or trunk line cord 15 as shown in FIG. 2.

Figure 5:
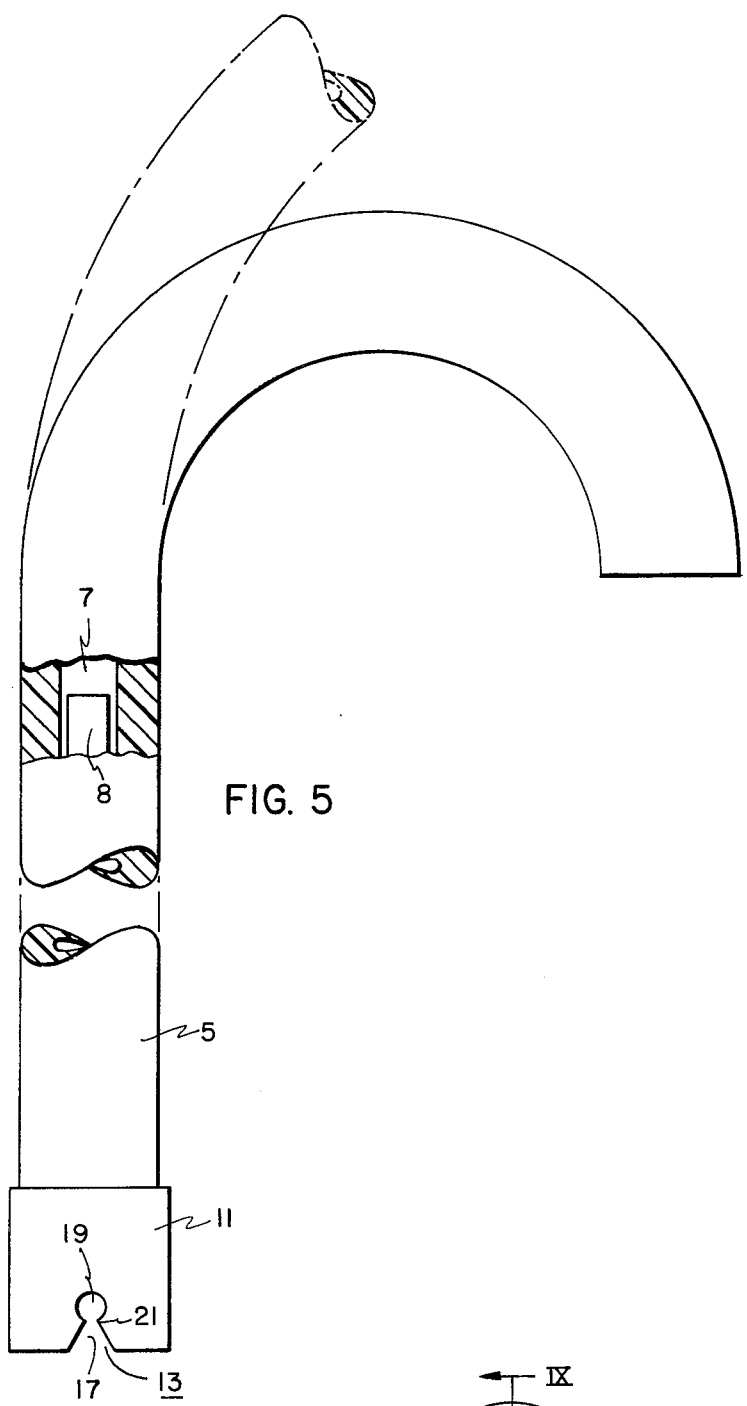
FIG. 5 is an elevational view of a tubular insert being bent to put a set in the end thereof.

The slots 13 are key hole shaped and as best shown in FIG. 5, they have a V-shaped notch or kerf 17 extending to the outer edge of the sleeve 11 and a circular opening 19 slightly smaller in diameter than the trunk line cord 15. The apex of the notch extends into the circular opening leaving a gap 21 where the two meet allowing the trunk line cord 15 to be slipped into the circular opening and captured snugly therein.

Figure 3:
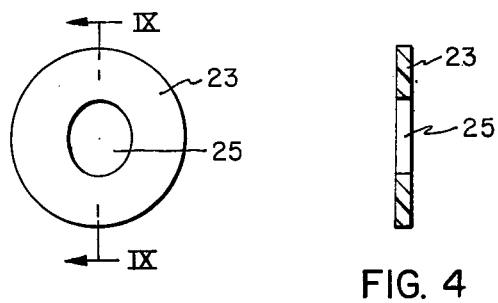
FIG. 3 is an enlarged plan view of a wafer utilized in this invention.
Figure 4:
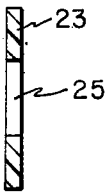
FIG. 4 is an enlarged sectional view taken along line IV—IV of FIG. 3.

A resilient positioning wafer or disc 23, shown in detail in FIGS. 3 and 4, is disposed in the sleeve 11 and abuts the end of the tubular insert 5. The positioning wafer 23 has a generally elliptical-shaped hole 25 centrally disposed therein. The minor diameter of the hole being slightly smaller than the diameter of the explosive cord 8 so that applying pressure on the edge of the disc opposite the major diameter of the elliptical opening distorts the opening allowing the explosive cord 8 to be easily positioned therein and when released to securely clamp the cord in a fixed position. The wafer 23 provides a dual function of positioning the explosive cord 8 axially within the continuation chamber or counterbore 9 and positioning the explosive cord 8 longitudinally within the bore so that the end will be centrally disposed within the sleeve so as to contact the trunk line 15 when it is pressed into the slot 13. The explosive cord 8 must generally be centrally disposed within the counterbore or attentuaton chamber 9 and generally extend into the bore only to the inner edge of the tube sheet 1.

When, as shown in FIG. 1, the tube 3 extends vertically upwardly from the tube sheet 1, it is difficult to hold the insert 5 in place within the tube 3 as the outer diameter of the insert 5 is such that it allows the insert 5 to slip freely within the tube 3 and the ends of the tube 3 are rolled so that their inner diameter varies. Therefore, to hold the inserts 5 within the tube 3 the ends of the inserts 5 beyond the portion containing the explosive cord 8 are bent by hand approximately 180° before being inserted into the tube 3. While the resilient insert 5 springs back, it takes a slight set so that the end is curved and when inserted into the tube 3, the insert 5 remains in place. Bending the insert 5 beyond the portion containing the explosive cord 8 allows that portion of the insert 5 containing the explosive cord 8 to remain generally straight so that the portion of the insert containing the explosive cord is centrally disposed within the tube 3 to effectuate even expansion of the tube 3 into engagement with the tube sheet 1.

To further hold the insert 5 in position, the sleeve 11 is biased toward the adjacent sleeve 11 as the trunk line 15 is pushed into the slot 13 and the circular opening 19 snugly captures the trunk line 15 exerting a lateral force on the insert 5 to help hold it within a vertically orient tube 3.

One or more interconnected trunk lines 15 are laced through a plurality of slots 13 in such a manner that the detonation may be performed in a quasi simultaneous matter utilizing a safety fuse or an electric blasting cap as an initiating device 27.

I claim:

1. A resilient insert for explosively expanding tube into a tube sheet utilizing an explosive cord, said resilient insert comprising an outer diameter which is slightly smaller than the inner diameter of said tube, a length substantially longer than said tube sheet is thick, a bore extending from one end of said insert for receiving said explosive cord, said bore being substantially longer than the tube sheet is thick, but not extending all the way through said insert, a counterbore, a sleeve attached to the outside of the end of said insert having the bore and counterbore, one end of said sleeve extending beyond the end of said insert and having diametrically opposed slots, the bottom of said slots being disposed adjacent the end of said insert, the other end of said sleeve being abuttable against the end of said tube, a positioning wafer having an outer diameter slightly smaller than the inner diameter of said sleeve, said wafer having a centrally disposed opening which tightly embraces said explosive cord and abuts the end of the insert to position the explosive cord within the bore of the insert.

2. A resilient insert as set forth in claim 1 wherein the slots are formed from a V-shaped notch which opens outwardly at the edge of the sleeve and a generally circular opening, the apex of the V-shaped notch being disposed within the circular opening so as to form a gap where the two meet.

3. A resilient insert as set forth in claim 1 wherein said wafer has a generally elliptical-shaped opening centrally disposed therein.

4. A resilient insert as set forth in claim 1 wherein the insert is made of a resilient material which will take a slight set when bent.

5. A resilient insert as set forth in claim 1 wherein the insert is made of polyethylene, which though resilient, takes a slight set after being bent.

* * * * *